United States Patent [19]
Masetti

[11] Patent Number: 5,497,261
[45] Date of Patent: Mar. 5, 1996

[54] SYNCHRONIZATION APPARATUS FOR AN OPTICAL COMMUNICATIONS NETWORK

[75] Inventor: Francesco Masetti, Paris, France

[73] Assignee: Alcatel N.V., Amsterdam, Netherlands

[21] Appl. No.: 324,607

[22] Filed: Oct. 18, 1994

[30] Foreign Application Priority Data

Oct. 21, 1993 [FR] France .................. 93 12571

[51] Int. Cl.⁶ ................................. H04B 10/00
[52] U.S. Cl. ........................ 359/158; 359/140; 359/173
[58] Field of Search ................... 375/371, 373; 359/158, 139, 140, 179; 385/17, 14; 327/141, 182

[56] References Cited

U.S. PATENT DOCUMENTS

| | | | |
|---|---|---|---|
| 5,220,448 | 6/1993 | Vogel et al. | 359/158 |
| 5,222,162 | 6/1993 | Yap et al. | 385/14 |
| 5,272,391 | 12/1993 | Ampe et al. | 327/141 |
| 5,274,680 | 12/1993 | Sorton et al. | 375/371 |
| 5,383,045 | 1/1995 | Vogel et al. | 359/158 |

FOREIGN PATENT DOCUMENTS

| | | | |
|---|---|---|---|
| 2170072 | 7/1986 | United Kingdom | 359/158 |
| WO9311579 | 6/1993 | WIPO | 385/14 |

OTHER PUBLICATIONS

F. Forghieri et al, "Novel Packet Architecture for All–Optical Ultrafast Packet–Switching Networks", *Electronics Letters*, vol. 28, No. 25, 3 Dec. 1992, pp. 2289–2291.

T. Matsunaga et al, "Experimental Application of LD Switch Modules to 256 Mbits/s Optical Time Switching", *Electronics Letters*, vol. 21, No. 20, 1 Sep. 1985, pp. 945–946.

C. Shu et al, "Optoelectronic Generation of Time Division Multiplexed Ultrafast Bit Stream on a Coplanar Waveguide", *Applied Physics Letters*, vol. 57, No. 27, 31 Dec. 1990, pp. 2987–2898.

French Search Report FR 9312571.

*Primary Examiner*—Leo Boudreau
*Assistant Examiner*—Bhavesh Mehta
*Attorney, Agent, or Firm*—Sughrue, Mion, Zinn, Macpeak & Seas

[57] ABSTRACT

The apparatus includes a delay member applying delays to signals received in an optical form, which form is that of an optical-type carrier wave carrying the signals. The delays are controlled so that the signals are synchronized on reference instants. According to the invention, the delay member receives said carrier wave and applies said controlled delays thereto so as to delay the signals, while leaving them in their optical form.

4 Claims, 1 Drawing Sheet

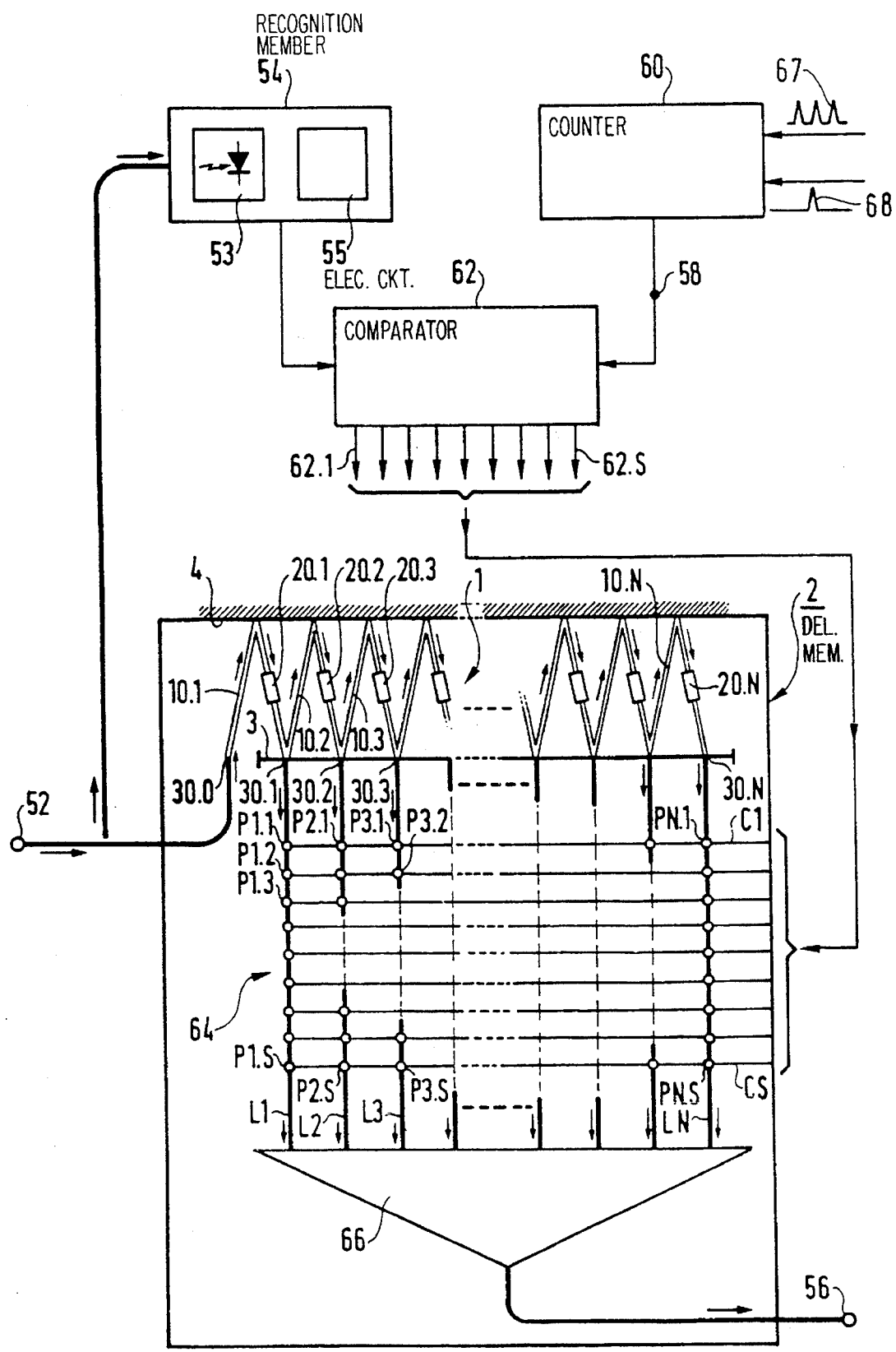

5,497,261

SYNCHRONIZATION APPARATUS FOR AN OPTICAL COMMUNICATIONS NETWORK

The present invention relates to optical fiber telecommunications systems. It concerns optical-signal synchronization apparatus for use, in particular, in a processor for processing packets of given length such as cells in a system operating in asynchronous transfer mode (ATM).

BACKGROUND OF THE INVENTION

A cell processor is constituted by opto-electronic interfacing apparatus for providing interfacing between an optical network, optionally wavelength multiplexed, and a switching or routing system implemented using photonic technology. Such a processor must be capable of performing all of the following functions: delimiting headers, synchronizing cells on a local clock, translating headers, calculating new headers, and generating internal routing information.

Known cell processors for photonic switching systems implement combined optical and electronic means. Their cell-synchronization apparatuses firstly detect the optical signals, and they then process the resulting electrical signals. When the switching system is implemented using photonic technology, the signals are then put back into optical form by laser emitters.

OBJECTS AND SUMMARY OF THE INVENTION

Objects of the present invention are to make optical-signal synchronization apparatus cheaper and more compact, in particular in a cell processor in an optical fiber telecommunications system, and to increase the passband and the reception quality of such a system.

To these ends, the present invention provides synchronization apparatus for an optical communications network, the apparatus including a comparator receiving firstly signals to be synchronized, the signals being received in an optical form, and secondly reference instants, the comparator controlling a delay member applying controlled delays to the signals to be synchronized so that the signals are synchronized on the reference instants, wherein said delay member applies said controlled delays while leaving the signals to be synchronized in their optical form.

BRIEF DESCRIPTION OF THE DRAWING

An embodiment of the present invention is described more particularly below by way of non-limiting example and with reference to the accompanying diagrammatic drawing, in which:

The sole FIGURE is an overall view of apparatus of the present invention.

MORE DETAILED DESCRIPTION

The apparatus includes the following elements: A signal input 52 connected to an optical fiber and for receiving an optical-type carrier wave. The carrier wave carries signals to be transmitted, e.g. information signals such as bits, cells made up of bits, packets made up of cells, or frames made up of packets in an asynchronous transfer mode system. The signals have respective characteristic instants, such as the start of such a signal, or a time marking pulse inserted in such a signal with a higher power level. The characteristic instants succeed one another at time intervals which are random but which have only limited differences relative to regular or known intervals.

A recognition member 54 for recognizing and supplying the characteristic instants of the information signals. For that purpose, the member receives a fraction (preferably a minority) of the carrier wave. For example, the recognition member includes an opto-electronic member 53 for receiving a fraction of the carrier wave and for detecting it. The recognition member also includes an electronic circuit 55 such as a processor or a threshold detector for recognizing the characteristic instants of the signals, and for supplying them in the form of electrical signals to the comparator.

A delay member 2 for applying controlled delays to the information signals. The delay member is of the optical type. It delays the information signals by receiving, delaying, and restoring said optical-type wave, without converting the signals into electronic form. An example of such a delay member is given below.

An output 56 for receiving and transmitting the information signals that have been delayed by said delay member.

A time reference input 58 for receiving reference signals carrying reference instants. The reference instants succeed one another at time intervals that are not greater than those of said characteristic instants. As a result, for each of said information signals, it is possible to define a time offset which is the time between the characteristic instant of the signal and the following reference instant. For example, the reference signals are supplied by a reference generator such as a counter 60. The generator receives clock pulses, such as bit pulses 67 and/or interval pulses 68 for cells. It counts the pulses so as to respond by supplying the reference instants to the comparator 62, e.g. in the form of electrical signals.

A comparator 62 receiving the characteristic instants and the reference instants. For each of the information signals, the comparator supplies a selection signal representing the time offset of the information signal. The comparator controls the delay member 2 via the selection signals so as to cause each information signal to be delayed by a delay equal to its time offset. In this way, each of said characteristic instants is caused to coincide with a reference instant, thereby achieving the desired synchronization.

Preferably, the delay member includes a semiconductive substrate incorporating a planar optical path 1, which path includes:

an input 30.0 for receiving the carrier wave;

outputs 30.1, . . ., 30.N, each output enabling an output fraction of the wave to be output; and a first waveguide 10.1 for guiding the wave from said input to a first output 30.1, a second waveguide for guiding a remaining fraction of the wave from the first output to a second output 30.2, a third waveguide 10.3 for guiding a remaining fraction from the second output to a third output 30.3, and so on to a last output 30.N. At least some of said waveguides, and preferably all of them, include amplifiers 20.1, . . ., 20N for maintaining the power of the carrier wave substantially constant.

Preferably, the optical path 1 zigzags between two opposite surfaces 3 and 4 formed by the substrate 2. The outputs 30.1, . . ., 30.N of the path are disposed along a partially reflective surface 3. An opposite surface 4 is provided with a light-reflecting covering for reflecting light from one portion of each waveguide to another.

The substrate 2 further incorporates a selection member 64. The selection member selects one of the outputs 30.1, ..., 30.N of said optical path on command, and it connects the selected output to the output 56 of the apparatus.

Preferably, the comparator 62 supplies each selection signal in a binary encoded form constituted by a succession of S selection bits that collectively define a value of the signal. The bits are supplied via respective outputs 62.1, ..., 62.S of the comparator. The selection member 64 is in the form of a matrix having N rows L1, ..., LN and S columns C1, ..., CS. Each row such as L3 is constituted by an optical waveguide connecting a respective output such as 30.3 of the optical path 1 to the output 56 of said apparatus via a concentrator 66. Each row includes, in series, a succession of optical gates such as P3.1, ..., P3.S, each of which can be opened or closed so that each row is open if all of its gates are open, and each row is closed if at least one of its gates is closed. Each optical gate is controlled in binary form by receiving a bit. Each optical gate is adapted to respond to zero bits or to one bits so as to be open only when it receives a zero bit or so as to be open only when it receives a one bit. Each column such as C3.S of said matrix is fed via a respective output 62.S of the comparator 62. Each column feeds, in parallel, a succession of N of said optical gates such as P1S, ..., PNS via the same one of said selection bits, the succession of N optical gates belonging to respective ones of the N rows. The adaptations of said optical gates are chosen so as to show up a respective correspondence between the rows and the values of the selection signal. The correspondence is such that each of the rows is the only one to be opened by a selection signal whose value has said correspondence with the row.

For example, the optical gates are constituted by phototransistors.

The following documents may be consulted on this subject:

Photonic time-switching using semiconductor optical amplifier gates and fibre delay line optical buffer—P. Morin, D. Chiaroni, J. B. Jacob, G. Da Loura, J. M. Gabriagues, B. Fernier—International Topical Meeting on Photonic Switching—Jul. 1–3, 1992—Photonic Switching 92—Conference Hall of Academy of Sciences, Minsk, Republic of Byelorussia;

Y-shaped semiconductor device as a basis for various photonic switching applications—K. Wunstel, W. Idler, M. Schilling, G. Laube, D. Baums, 0. Hilderbrand— OFC '92, Cosponsored by Optical Society of America—IEEE/Communications Society—IEEE/Lasers and Electroptics Society—Technical Digest, p. 125;

optically Controlled Semiconductor Optical Amplifier Gates—C. Joergensen, T. Durhuus, B. Fernier, P. Garabedian, E. Derouin, F. Leblond, B. Mikkelsen, K. E. Stubkjaer—Ecoc'92—Technische Universität Berlin— Berlin, Germany—Proceedings, volume 1, Regular papers, p. 377–380; and Light Amplification Functional Devices—Akio Sasaki— Optical Computing in Japan—Edited by S. Ishihara Nova— Science Publishers, 1990 Commack.

I claim:

1. A synchronization apparatus for an optical communications network, the apparatus comprising:

a comparator receiving, firstly, signals to be synchronized, the signals being received in a optical form, and, secondly, reference instants;

a delay member applying delays to the optical signals to be synchronized, and supplying delayed optical signals via respective outputs; and a selection member for selecting one of said outputs of said delay member, said comparator controlling the selection member so that the signals supplied by the selected one output are synchronized on the reference instants;

wherein said comparator supplies selection signals in a binary encoded form constituted by a succession of S selection bits that collectively define a value of each signal and that are supplied via respective outputs of the comparator, said selection member being in the form of a matrix having N rows and S columns, each row being constituted by an optical waveguide connecting a respective output of said delay member to the output of said apparatus via a concentrator, each row including, in series, a succession of optical gates, each of which can be opened or closed so that each row is open if all of its gates are open, and each row is closed if at least one of its gates is closed, each of said optical gates being controlled in binary form by receiving a bit and by being adapted to respond to zero bits or to one bits so as to be open only when it receives a zero bit or so as to be open only when it receives a one bit, each column of said matrix being fed via a respective output of said comparator, and feeding, in parallel, a succession of N of said optical gates via one of said selection bits, the succession of N optical gates belonging to respective ones of the N rows, the adaptations of said optical gates showing up a respective correspondence between said rows and the values of said selection signal, each of said rows being the only one to be opened by a selection signal whose value has said correspondence with the row.

2. Apparatus according to claim 1, the apparatus including:

a signal input for receiving an optical-type carrier wave carrying signals to be transmitted, the signals constituting information signals and having respective characteristic instants, the characteristic instants succeeding one another at time intervals;

a recognition member receiving a fraction of said carrier wave, for recognizing and supplying said characteristic instants;

said delay member for applying controlled delays to the signals;

an output for receiving and transmitting the signals delayed by said delay member;

a time reference input for receiving reference signals carrying reference instants, the reference instants succeeding one another at time intervals that are not greater than those of said characteristic instants, so that each of said information signals has a time offset which is the time between its characteristic instant and the following reference instant; and a comparator receiving said characteristic instants and said reference instants, and supplying, for each of said signals to be transmitted, a selection signal representing the time offset of the signal, the comparator controlling said delay member via said selection signal so as to cause the delay member to delay each signal to be transmitted by a time equal to its time offset so that each of said characteristic instants is caused to coincide with one of said reference instants.

3. Apparatus according to claim 2, further including a reference generator receiving clock pulses and counting them so as to respond by supplying said reference instants to said comparator.

4. Apparatus according to claim 2, wherein said delay member includes a semiconductive substrate incorporating a planar optical path, which path includes:

an input for receiving said carrier wave;

outputs, each output enabling an output fraction of the wave to be output; and a first waveguide for guiding the wave from said input to a first output, a second waveguide for guiding a remaining fraction of the wave from the first output to a second output, a third waveguide for guiding a remaining fraction from the second output to a third output, and so on to a last output, at least some of said waveguides including amplifiers for maintaining the power of the carrier wave;

said substrate further incorporating said selection member for selecting one of said outputs of said optical path on command, and for connecting the selected output to said output of the apparatus.

* * * * *